(12) United States Patent
Birch et al.

(10) Patent No.: US 6,379,746 B1
(45) Date of Patent: Apr. 30, 2002

(54) METHOD FOR TEMPORARILY PROTECTING GLASS ARTICLES

(75) Inventors: William Birch, Samois sur Seine (FR); Dana C. Bookbinder, Corning, NY (US); Alain R. E. Carre, Le Chatelet-en-Brie (FR); David L. Tennent, Campbell, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/495,166

(22) Filed: Jan. 31, 2000

Related U.S. Application Data

(63) Continuation-in-part of application No. 09/258,630, filed on Feb. 26, 1999, now abandoned.

(30) Foreign Application Priority Data

Feb. 2, 1999 (EP) ............................................ 99400225

(51) Int. Cl.[7] .................................................. B05D 7/24
(52) U.S. Cl. ...................... 427/154; 427/165; 427/168; 427/289; 427/293; 427/368; 427/65; 427/60.3; 427/61
(58) Field of Search .......................... 65/60.3, 61, 60.1; 427/154, 289, 293, 165, 168, 368

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 3,926,604 A | 12/1975 | Smay et al. | |
| 3,959,563 A | 5/1976 | Vaughn, Jr. et al. | |
| 4,066,786 A | * 1/1978 | Bent et al. | 424/313 |
| 4,082,526 A | 4/1978 | Estes et al. | |
| 4,164,402 A | * 8/1979 | Watanabe | 65/30 E |
| 4,200,463 A | 4/1980 | Flowers et al | |
| 4,267,208 A | 5/1981 | Ireland | |
| 4,272,587 A | * 6/1981 | Santiago | 65/60 . |
| 4,273,809 A | 6/1981 | LaLiberte et al. | |
| 4,273,834 A | 6/1981 | Yokokura et al. | |
| 4,309,814 A | 1/1982 | Takamatsu et al. | |
| 4,420,578 A | 12/1983 | Hagens et al. | |
| 4,433,013 A | 2/1984 | Puhringer | |
| 4,544,395 A | 10/1985 | Evans | |
| 4,715,878 A | * 12/1987 | Kopatz et al. | 65/21.1 |
| 4,753,827 A | 6/1988 | Yoldas et al. | |
| 5,204,126 A | 4/1993 | Singh et al. | |
| 5,330,788 A | 7/1994 | Roberts | |
| 5,429,838 A | 7/1995 | Mansson et al. | |
| 5,622,540 A | * 4/1997 | Stevens | 65/112 |
| 5,716,705 A | 2/1998 | Wirth et al. | |

FOREIGN PATENT DOCUMENTS

| | | |
|---|---|---|
| CA | 811098 | 4/1969 |
| DE | 276 084 | 2/1990 |
| FR | 2 752 834 | 3/1998 |
| GB | 2 106 008 | 4/1983 |
| JP | 62-265146 | 11/1987 |
| JP | 6-031634 | 2/1994 |

OTHER PUBLICATIONS

Botre, C., De Martiis, F. and Solinas, M., "On the Interaction between Macromolecules and Colloidal Electrolytes," E; M. J. Phys. Chem., 1964, 68:3624–3628, (No month).

(List continued on next page.)

Primary Examiner—Shrive P. Beck
Assistant Examiner—Kirsten A. Crockford
(74) Attorney, Agent, or Firm—Angela N. Nwaneri; Maurice M. Klee

(57) ABSTRACT

Methods for temporarily protecting a surface of a glass article by coating the surface are provided. The methods include forming a stable, hydrophobic, removable film on the surface at the end of the glass manufacturing process while the glass is still at an elevated temperature (e.g., above 175° C.). The film reduces chip adhesion to the surface as a result of cutting and grinding. After cutting and grinding, the film is removed allowing the glass to be used in such processes as the manufacture of liquid crystal displays (LCDs).

31 Claims, 3 Drawing Sheets

OTHER PUBLICATIONS

Goloub, T. P., Koopal, L.K., Bijsterbosch, B. H., "Adsorption of Cationic Surfactants on Silica. Surface Charge Effects," *Langmuir* 1996, 12:3188–3194. (No month).

Goloub, T. P., Koopal, L. K. "Adsorption of Cationic Surfactants on Silica. Comparison of Experiment and Theory," *Langmuir* 1997, 13:673–681, (No month).

Greenwood, F.G., Parfitt, G. D., Picton, N. H., Wharton, D. G., "Adsorption and Wetting Pheonomena Associated with Graphon in Aqueous Surfactant Solutions," *Adsorption from Aqueous Solution,* Adv. Chem. Series 79, American Chemical Society, Washington, D.C., 1968, 135–144, (No month).

Griffith, M. J., Alexander, A. E., "Equilibrium Adsorption Isotherms for Wool/Detergent Systems," *J. Colloid Interface Sci.,* 1967, 25:311–316, (No month).

Groot, R. C., "Adsorption of sodium dodecyl sulfate by polyamide powder, and the effect of the pH on adsorption," 5$^{th}$. Int. Cong. Surface–Active Substances, Barcelona, Spain, Sep. 1968, II, 581–593.

Harwell, J. H., Scamehorn, J. F. "Adsorption from Mixed Surfactant Systems", in *Mixed Surfactant Systems,* Surfactant Series vol. 46, Ogino, K, and Abe, M, Ed.; Marcel Dekker, Inc. New York, 1992, 263–281, (No month).

Rosen, M. J. *Surfactants and Interfacial Phenomena,* 2$^{nd}$ Edition, Wiley–Interscience, New York, 1989, 33–107 and 337–362, (No month).

Smay, G. L., "Interactions of organic coatings with metal oxide coatings and glass surfaces," *Glass Technology* 1985, 26:46–59, (No month).

Somasundaran, P., Fuerstenau, D. W., "Mechanisms of Alkyl Sulfonate Adsorption at the Alumina–Water Interface," *J. Phys. Chem.* 1966, 70:90–96, (No month).

Tadros, T. F., "Suspensions," *Surfactants,* Academic Press, Orlando, Florida, 1984, 197–220, (No month).

Vig, J. R, "UV/ozone cleaning of surfaces," *J. Vac. Sci. Technol.* 1985, A 3:1027–1033, (No month).

Zajac, J., Tompette, J. L., Partyka, S., "Adsorption of Cationic Surfactants on Hydrophilic Silica Surface at Low Surface Coverages: Effects of the Surfactant Alkyl Chain and Exchangeable Sodium Cations at the Silica Surface," *Langmuir* 1996, 12:1357–1367, (No month).

\* cited by examiner

METHOD FOR TEMPORARILY PROTECTING GLASS ARTICLES

CROSS REFERENCE TO RELATED APPLICATION

This is a continuation-in-part of U.S. application Ser. No. 09/258,630, filed Feb. 26, 1999, now abandoned the content of which in its entirety is hereby incorporated by reference.

FIELD OF THE INVENTION

The present invention is directed to a method for temporarily protecting glass articles, in particular for protecting the surfaces of glass articles such as Liquid Crystal Display (LCD) glass. The method is useful, for example, for protecting glass articles from ambient contaminants and for preventing glass chip adhesions during cutting or grinding of the glass article.

BACKGROUND OF THE INVENTION

Many uses of glass, including LCD glass, require a very clean glass surface that is substantially free of dust and organic contaminants. When exposed to the environment, glass can quickly become contaminated with organic contaminants, with contamination being observed within a few minutes. Cleaning processes currently used for cleaning LCD glass often involve several steps and require a variety of chemicals. There is a need, therefore, for a method of protecting a glass surface from ambient dirt during manufacture, shipping and storage to minimize or even eliminate the need for chemicals to provide a clean glass surface.

Current procedures used to cut and grind glass surfaces and edges often generate small glass chips (e.g., chips having a size greater than 1 micron and less than about 100 microns). Some of these particles irreversibly adhere to the clean glass surface, rendering the glass useless for most applications. This is particularly a serious problem in the case of LCD glass surfaces.

LCD glass can be made by a fusion draw process, which yields flat, smooth glass surfaces which can be cut or ground to the desired size. Some of the glass chips generated from the cutting process originate from the surface of the glass. When the flat surface of these chips comes into contact with the surface of the glass plate, there can be a large contact area between the chips and the glass surface which promotes strong adhesion. If a water film condenses between these two surfaces, permanent chemical bonding may occur, in which case the adhesion of the glass chips to the surface becomes irreversible. This may make the glass useless for LCD applications.

One known method of protecting glass sheets, specifically, sheets of LCD glass, is to apply a polymer film on both major surfaces of the glass to protect the glass during the scoring, breaking and beveling processes. In a typical method, one major surface has a polymer film attached with an adhesive, and the other major surface has a film attached by static charge. The first film is removed after the edge finishing (cutting or grinding) of the sheet is completed, while the second is removed prior to the finishing process. Although the adhesive-backed film protects the surface from scratching by the handling equipment, it causes other problems. For example, the polymer may entrap glass chips produced during the finishing process, leading to a build up of glass chips and scratching of the glass surface, particularly near the edges of the surface. Another problem with this film is that it may leave an adhesive residue on the glass surface. There is a need, therefore, for a method of protecting a glass surface from chip adhesions that does not leave any residual coating on the glass surface, and for a method of temporarily protecting glass surfaces, whereby a glass article with a clean, coating-free surface can be readily obtained for further use.

Organic coatings have been used to protect glass surfaces for many years. See, for example, Smay, G. L. *Glass Technology* 1985, 26, 46–59. Often oleic acid or stearic acid solutions are applied to create a lubricious coating allowing glass bottles to slide among each other without generating flaws or cracks in the manufacturing process. Oleic and stearic acids have long aliphatic chains which render them relatively insoluble in water. Therefore, an alcohol/water solution is required if, for example, the lubricating layer is to be applied by spraying. In terms of the manufacturing of glass and, in particular, LCD glass, the alcohol in the alcohol/water solution is a serious problem since when sprayed on a hot glass surface the alcohol will rapidly evaporate and can produce a flammable and potentially explosive mixture of air and alcohol vapor.

Oleic and stearic acid coatings are also unsuitable for use in protecting LCD glass because their chain-chain interactions are very strong. As a result, the coatings are difficult to remove even in a basic, detergent wash.

A critical aspect of any coating used to temporarily protect LCD glass is removability. Manufacturers of liquid crystal displays use LCD glass as the starting point for complex manufacturing processes which typically involve forming semiconductor devices, e.g., thin film transistors, on the glass substrate. To not adversely affect such processes, any coating used to protect LCD glass must be readily removable prior to the beginning of the LCD production process.

Some materials, such as silanes and siloxanes, may be able to satisfy the removability criterion in a qualitative sense, i.e., under suitable conditions they can be substantially completely removed from a glass surface, and yet the materials are still unacceptable for use with LCD glass based on this very same criterion. This is because manufacturers of liquid crystal displays consider these materials so potentially disruptive of the LCD production process that even the most minimal residual levels of the materials are not considered acceptable. Accordingly, although basically removable, these materials do not satisfy the removability criterion as applied in practice (i.e., the level of removability which a protective coating must achieve is a function of the composition of the coating).

Another class of materials which needs to be avoided in connection with glasses to be used to make liquid crystal displays are those that contain alkalis. This is because alkalis, even in small amounts, are known to poison thin film transistors. Similarly, metals, especially heavy metals, are undesirable since they can change the electrical properties of the glass surface.

Like the oleic and stearic acid coatings discussed above, anionic and cationic surfactants have been applied to glass surfaces. While most anionic surfactants are soluble in water, they do not form good stable coatings on glass in the presence of water. As shown by the data presented below, these surfactants were found unsuitable for use in protecting LCD glass.

The adsorption of cationic surfactants onto silica in solutions has been studied by a number of investigators in connection with understanding the dispersion of colloidal silica. See Goloub, T. P., Koopal, L. K., Bijsterbosch, B. H. *Langmuir* 1986, 12, 3188–3194; Goloub, T. P., Koopal, L. K., *Langmuir* 1997, 13, 673–681; Zajac, J., Tompette, J. L., Partyka, S., *Langmuir* 1996, 12, 1357–1367; Rosen, *M. J. Surfactants and Interfacial Phenomena*, J. Wiley & Sons, New York, 1989, Chapter 2; and Harell, J. H., Scamehorn, J. F. "Adsorption from Mixed Surfactant Systems", in *Mixed Surfactant Systems*, Surfactant Series Vol. 46, Ogino, K, and Abe, M, Ed.; Marcel Dekker, Inc. New York, 1992, pp. 263–281. At neutral pH, silicate surfaces are usually negatively charged allowing the ready adsorption of cationic species. The application of a cationic surfactant to glass at a temperature below the boiling point of water has been disclosed in Evans, U.S. Pat. No. 4,544,395.

As described in detail below, in accordance with the present invention, it has been discovered that cationic surfactants of various types (as well as non-ionic surfactants and betaines) are able to rapidly organize on hot glass (i.e., on glass having a temperature above 175° C.) and form a coating which is sufficiently hydrophobic (i.e., has a sessile drop contact angle of at least 40°) to substantially reduce adhesion of glass chips to the glass (e.g., to reduce adhesion of glass chips of a size greater than 1 micron by at least 80%). The prior work involving cationic surfactants and glass do not disclose or suggest this important result.

To summarize, there has been a need in the art for a method for protecting glass articles, specifically, sheets of LCD glass, which has the following characteristics:

(1) the method must be one that can be readily incorporated in the overall glass forming process, specifically, at the end of the forming process, so that newly formed glass is protected substantially immediately after it is produced; among other things, to meet this criterion, the coating material must be (a) able to withstand the environment (e.g., high temperatures) of a glass forming line and (b) the method of applying the material must be safe for use in such an environment;

(2) the coating must be sufficiently hydrophobic to protect the glass from chip adhesion resulting from cutting and/or grinding of the glass sheet, as well as the adhesion of other contaminants, e.g., particles, that the glass may come into contact with during storage and shipment prior to use;

(3) the coating must be sufficiently robust to continue to provide protection after being exposed to substantial amounts of water during the cutting and/or grinding process;

(4) the coating must be substantially completely removable from the glass prior to its ultimate use in, for example, producing a liquid crystal display; and (5) the coating must be composed of a material which can be tolerated in low levels in the ultimate use of the glass.

The present invention addresses and satisfies this long standing need in the art.

SUMMARY OF THE INVENTION

The present invention provides methods for temporarily protecting a surface of a glass article from ambient dirt and methods for temporarily protecting a surface of a glass article from chip adhesions.

In accordance with a first of its aspects, the invention provides a method for temporarily protecting a surface of a glass article by coating the surface with a removable hydrophobic film (also referred to herein as a "hydrophobic coating" or simply a "coating"). The film can have a thickness of from about one molecule to about ten molecules or, if desired, can have a thickness greater than ten molecules.

In accordance with a second of its aspects, the invention provides a method of reducing chip adhesions when making a cut or ground glass article, including (A) forming a stable hydrophobic film on the surface of the article; (B) cutting or grinding the glass article; and (C) removing the film. Again, the film can have a thickness of from about one molecule to about ten molecules or, if desired, can have a thickness greater than ten molecules.

In accordance with both of these aspects, the invention provides a method for treating glass having at least one substantially flat surface comprising:

(a) forming a hydrophobic coating on the surface by applying an aqueous solution comprising at least one surfactant to the surface as part of the manufacturing process for the glass, wherein:
  (1) the manufacturing process produces newly formed glass at an elevated temperature;
  (2) the newly formed glass is at a temperature above 175° C. (preferably above 200° C.) when it first comes into contact with the aqueous solution;
  (3) the surfactant is selected from the group consisting of cationic surfactants, non-ionic surfactants, and betaines; and
  (4) the coating reduces adhesion of glass chips to the surface;

(b) cutting the glass;

(c) grinding and/or polishing at least one edge of the cut glass; and (d) removing the coating from the surface; wherein:
  (i) water or a water-containing solution is applied to the coated surface during at least one of steps (b) and (c); and
  (ii) the coating has a sessile drop contact angle of at least 40° after steps (b) and (c).

In certain preferred embodiments, the coating is applied by spraying onto the hot glass. Other approaches for applying the coating can be used, e.g., dipping, meniscus coaters, wick coaters, etc., but are less preferred since the hot glass can often exhibit substantial back-and-forth movement at the end of the glass manufacturing process, especially, when a overflow downdraw process is used.

In other preferred embodiments, the coating is removed using an aqueous detergent solution, e.g., a commercial detergent package, preferably in combination with brush washing and/or ultrasonic cleaning. In addition, the surface of the coating can be exposed to an oxidizing atmosphere prior to being contacted with the detergent solution. The oxidizing atmosphere/detergent solution combination is preferably combined with brush washing and/or ultrasonic cleaning. The oxidizing atmosphere can be produced by corona discharge, through the use of UV light to produce ozone, or by means of an oxygen plasma. Ozonated water can also be used. Although less preferred, the oxidizing atmosphere approach by itself can be used to remove the coating.

Other aspects of the invention are described in detail below.

SURFACTANT TECHNOLOGY

Figure 1:
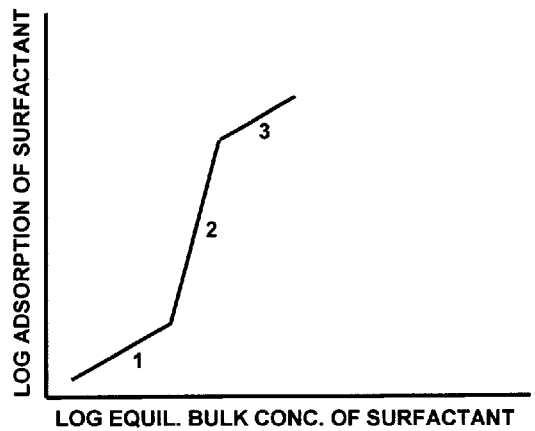
FIG. 1 shows an idealized adsorption isotherm for an ionic surfactant onto an oppositely charged surface under equilibrium conditions.

The adsorption of surfactants onto surfaces has been studied for many years especially with regard to the dispersion and flocculation of inorganic powders in aqueous and nonaqueous systems. See Rosen, M. J. *Surfactants and Interfacial Phenomena,* $2^{nd}$ Edition, Wiley-Interscience, New York, 1989, pages 337–361; Tadros, T. F. (Editor) *Surfactants*, Academic Press, Orlando, Florida, 1984, pages 197–220; Botre, C., De Martiis, F. and Solinas, *M. J. Phys. Chem.*, 1964, 68, 3624; Zajac, J., Trompette, J. L., Partyka, S. *Langmuir*, 1996, 12, 1357; Goloub, T. P., Koopal, L. K., Bijsterbosch, B. H., Sidorova, M. P. *Langmuir*, 1996, 12, 3188; and Goloub, T. P., Koopal, L. K. *Langmuir*, 1997, 13, 673.

Several adsorption mechanisms have been proposed depending upon the solution concentrations of the surfactants, the ionic strength, presence of other moieties, and to a limited extent temperature. Among other things, the structure of surfactants condensed onto inorganic media has been a focus of this work.

The factors which affect the formation of a good coating include the size of the head, the number and length of hydrophobic chains, the unsaturation and branching of the chains, the concentration of the surfactant, the ionic strength of the solution, the presence of other substances in solution, and the nature of the surface being coated. Silica and silicate based glasses in general have a negatively charge surface at pH 7. See Zajac, J., Trompette, J. L., Partyka, S. *Langmuir*, 1996, 12, 1357.

Significantly with regard to the present invention, the studies on surfactant adsorption from aqueous solutions reported in the literature have been for equilibrium conditions and relatively low temperatures. The surfactant coatings of the invention, on the other hand, are formed under non-equilibrium conditions and at high temperatures.

Work done by Somasundaran and Fuerstenau (Somasundaran, P., Fuerstenau, D. W.,*J. Phys. Chem.* 1966, 70, 90) has shown that the adsorption isotherm for ionic surfactants adsorbed onto silica immersed in solution has three regions. (See FIG. 1 from Rosen, M. J. *Surfactants and Interfacial Phenomena,* $2^{nd}$ Edition, Wiley-Interscience, New York, 1989.) In the first region, the surfactant adsorbs by ion exchange. In the second region, the stabilization caused by the interaction of the hydrophobic tail results in an increased rate of adsorption. The molecules form aggregates on the surface called hemimicelle adsorption. By the end of region 2, the surface charge is reversed by the adsorption of the surfactant. In region 3, the addition of each additional molecule requires overcoming the electrostatic repulsion but gains the interaction stabilization of the hydrophobic chains. Hence the rate of adsorption decreases. There are reports in the literature that the onset of region 3 is related to the critical micelle concentration (i.e., the concentration at which the surfactant molecules start to form micelles). See Griffith, M. J., Alexander, A. E. *J. Colloid Interface Sci.*, 1967, 25, 311; Greenwood, F. G., Parfitt, G. D., Picton, N. H., Wharton, D. G *Adsorption from Aqueous Solution*, Adv. Chem. Series 79, American Chemical Society, Washington, D. C., 1968, 135; and Groot, R. C. $5^{th}$. Int. Cong. Surface-Active Substances, Barcelona, Spain, September, 1968, II, p.581.

Figure 2:
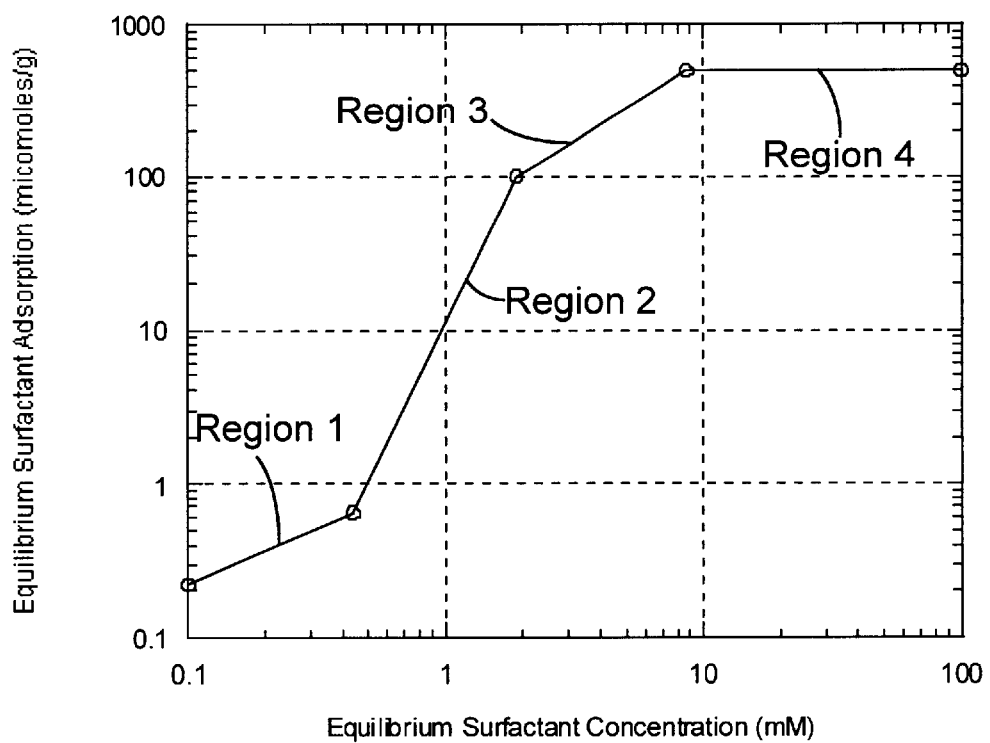
FIG. 2 shows a typical surfactant adsorption isotherm for the adsorption of a long chain quaternary ammonium salt onto silica again under equilibrium conditions.

The equilibrium adsorption of long chain quaternary ammonium salts to silica follows a curve similar but not identical to that of FIG. 1. FIG. 2 shows a typical curve. The curve of this figure is an approximation of FIG. 1 of Harell, J. H., Scamehorn, J. F. "Adsorption from Mixed Surfactant Systems", in *Mixed Surfactant Systems*, Surfactant Series Vol. 46, Ogino, K, and Abe, M, Ed.; Marcel Dekker, Inc. New York, 1992, pp. 263–281.

As shown in FIG. 2, the initial region is typical of dilute surfactant solutions which are well below the critical micelle concentration. Above that concentration, any added surfactant results in a higher density of micelles but not a higher density of free molecules in solution. In region 1, adsorbed molecules are relatively isolated and do not generally associate with each other. Region 2 sees a sharp increase in the slope which is the result of the increase in association of the long chains. In region 3, the surface charge has been neutralized and the available places for the additional surfactant molecule to adsorb drops off. As a result, the slope decreases considerably. Finally, in region 4, the surface is saturated and nothing more can adsorb onto the original surface. The breakpoint between regions 3 and 4 is generally at the critical micelle concentration for the given surfactant.

As with FIG. 1, the curve of FIG. 2 is for equilibrium conditions and thus, although it provides a general framework, is not directly applicable to the conditions under which surfactants are applied to glass surfaces in accordance with the invention.

DETAILED DESCRIPTION OF THE INVENTION

As embodied and broadly described herein, the present invention provides a method for temporarily protecting the surface of a glass article by providing a removable film on the surface of the article. The film can have a thickness of from about one molecule of film-forming material to about ten molecules of such material. A film thickness on the order of one molecule is referred to herein as a "monolayer." Thicker films can be used, if desired, and for many applications are preferred since they will withstand the water washes that occur during cutting, grinding, and edging of glass sheets.

The glass article protected by a film in accordance with the present invention may be any glass article. In one embodiment of the invention, the article is a sheet of glass. In another embodiment of the invention, the glass article is a sheet of Liquid Crystal Display (LCD) glass.

One application of this invention is to protect a glass article from ambient contaminants. In accordance with this method, one or more surfaces of the article is coated with a film composed of a cationic, nonionic, or betaine surfactant.

The coated glass may be exposed to ambient contaminants, for example, during storage or transportation, and preferably is shipped and stored in a sealed plastic or glass container. The coated surfaces preferably are handled by their edges because the film is not designed to be scratch-resistant. After unpacking, the film is easily removed in any of a number of ways including through the use of the washing procedures discussed below, by UV/ozone cleaning, or by using a solution comprising a component which etches the glass surface and a wetting agent. The resulting surface is clean, dry, and uniformly hydrophilic. This method is advantageous in that the protective film is easy to apply and easy to remove, and results in a glass article with a clean, dry, uniformly hydrophilic surface.

Another particular application of the method of the present invention is a method of reducing chip adhesions when making a cut or ground glass article. As discussed above, glass chip adhesions present a significant problem in the manufacture of cut or ground glass, particularly in the manufacture of LCD glass. The present invention prevents the formation of chip adhesions by providing a stable, removable, hydrophobic film on the surface of the glass article. As used herein, the phrase "stable . . . removable" film means a film that is bonded to the glass and that is not removed or significantly degraded during handling, storage and shipping, but is removable. The film adheres to the glass via interactions with the silica on the glass surface, and acts as a barrier between the surface of the glass article and the glass chips. Because the film reduces or prevents glass chips from coming into contact with the surface of the glass article, the occurrence of chip adhesion is reduced. Moreover, the hydrophobic film may reduce water condensation that leads to permanent chip adhesion.

To prevent chip adhesion, a stable, removable hydrophobic film is provided on a surface of the glass article, the glass article is cut or ground, and the film is removed. As in protecting the glass from contaminants, the film used to protect the glass from chip adhesion is composed of a cationic, nonionic, or betaine surfactant.

The film can have various thicknesses, e.g., from about one to about ten molecules, or less than a few hundred nanometers, or less than 100 nanometers, or from a few nanometers to a few tens of nanometers. To permit visual inspection of the glass for defects, the film either as originally applied to the glass or after a water wash can have a thickness which causes it to be invisible to the naked human eye. Invisibility indicates a coating thickness of well under a micron, likely on the order of from a few nanometers to a few tens of nanometers, such as on the order of one molecule. Such a thickness makes the film readily removable with, for example, UV/ozone cleaning or pyrolysis without significantly altering the glass surface or leaving a significant residue that may interfere with the final product, where the glass is coated with another material.

The coating density of the film should be sufficient to completely cover the glass surface. For example, a film on the order of 2 nm thick would have a density of about 2 grams per 1000 square meters of surface. The density can be estimated as follows: if A is the thickness of the coating in nanometers, the coating density per thousand square meters is on the order of A, in grams. This result comes from the following order-of-magnitude calculation:

Assume a coating material density of 1000 kg/m$^3$

Coating volume=Thickness×Surface area

Mass (g)=A(×10$^{-9}$ m×1000 m$^2$×1000 kg/M$^3$×1000 g/kg)

Figure 3:
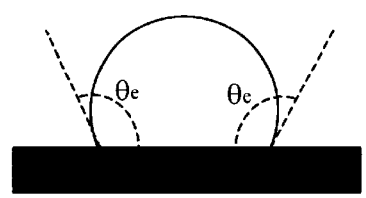
FIG. 3 illustrates the measurement of sessile contact angles of water drops on a coated glass substrate.

To verify the application of a film adequate for reducing or preventing chip adhesions, the wettability of the film can be measured. This can be done easily by measuring the contact angle of a liquid drop on the coated surface, which can be performed by a variety of techniques known in the art. A schematic diagram of the contact angle measurement is shown in FIG. 3, where $\theta_c$ is the sessile drop contact angle. Advantageously, the contact angle of sessile water drops has a value of at least 40 degrees, preferably at least 50 degrees. Such contact angles reduce chip adhesions by at least about 80% to at least about 90%.

Various techniques can be used to measure levels of chip adhesion. For example, glass plates protected with a coating of the invention can be used to generate glass chips by cutting them in half and scraping their newly exposed edges together. These chips can then be deposited onto unprotected glass receiver plates, or onto glass receiver plates protected with a coating of the invention. As a control, unprotected glass plates can also be used to generate chips and these chips allowed to fall onto unprotected glass plates. The receiving plates can, for example, have dimensions of 4"×4" or 6"×6".

The chip-deposited glass plates are then stored in a 95% relative humidity chamber, maintained at 25° C., for three or six weeks to simulate glass packing, shipping and storage conditions. The glass plates are washed before chip measurement to remove non-adhered chips, and the number of adhered chips is counted.

As another technique for measuring reductions in chip adhesion, glass powder can be applied to coated and uncoated glass plates, followed by storage at 85% humidity/85° C., followed by cleaning and chip counting. Further variations in determining chip adhesion levels will be evident to those skilled in the art.

Surfactant Films

As discussed above, the coatings of the invention are composed of surfactants. More particularly, the coatings of the invention consist essentially of surfactants. As used herein, the phrase "consists essentially of" excludes other components that may materially affect the film. Thus, "a film consisting essentially of at least one surfactant" contains the at least one surfactant and may also comprise other components that do not materially affect the film, such as binders, solvents, and the like.

Examples of suitable surfactants include cationic surfactants, nonionic surfactants, and betaines. As used herein, the term "surfactant" encompasses compounds that are surface active because of bifunctionality due to having at least one soluble, hydrophilic end and at least one insoluble, hydrophobic end. As known in the art, a betaine is a polar molecule (a zwitterion when in a solution whose pH corresponds to or is above the molecule's isoelectric point) typically having a carboxylic acid end and a quaternary ammonium end.

Cationic surfactants that have a hydrophobic tail and a positively charged head, such as hexadecyltrimethylammonium bromide (CTAB), are useful in accordance with the present invention. Films comprising a cationic surfactant tend to adhere to the glass surface via attraction between the positively charged head and the negative charges on the glass surface, and can be applied, for example, by spraying an aqueous solution of the surfactant onto the glass article while the article is at an elevated temperature. Although less preferred, the surfactant may also be applied by dipping, spin-coating, or any other process which brings a surfactant solution into contact with the glass surface. Optionally, the application step may be followed by a rinsing step.

The film may optionally comprise one surfactant or a mixture of surfactants, such as a mixture of two, three, or more surfactants. The film may comprise mixtures of cationic surfactants, mixtures of non-ionic surfactants, mixtures of betaines, or combinations thereof, e.g., mixtures of cationic and/or non-ionic surfactants. Alternatively, a plurality of films each comprising a different surfactant may be sequentially applied to the surface. For example, films comprising different cationic surfactants, different non-ionic surfactants, different betaines, or different combinations thereof may be applied to the surface. It may be advantageous to use a mixture of surfactants or a plurality of films when, for example, the glass surface to be coated does not have a uniform negative surface charge or has regions of different (positive, negative or neutral) charge. When surfactants that tend to aggregate in solution are used, they preferably are used as components of sequentially applied films to avoid the aggregation (i.e., to avoid attraction by forces stronger than those induced by their amphiphilic properties) that may occur if they were present in a single solution. For surfactants that do not irreversibly aggregate in solution, the surfactants can be mixed and an aqueous solution of the mixture applied directly to the glass using the techniques discussed above.

The preferred cationic surfactants are quaternary ammonium salts having 1–2 alkyl (or a mix alkyl/alkene) chains with an average length of 8–18 carbons. This is part of a class of compounds that has the chemical formula of $(R_1)_a(R_2)_b NX$ where $R_1$ is a saturated or unsaturated, straight or branched chain containing 8–24 carbons, $R_2$ is a saturated or unsaturated group containing 1–6 carbons, a=1,2, or 3, b=(4-a), N is nitrogen, and X is an anion (including but not limited to fluoride, chloride, bromide, iodide, and acetate). In addition to carbon, the chains can include heteroatoms.

$R_2$ is typically a methyl group but can also be an ethyl, propyl (n- or iso-), or butyl (n-, 2-, or tert-) group. However, as these groups get larger, the head limits the packing density of the surfactant on the surface and the stabilization that comes from chain:chain interactions decreases.

The starting materials for quaternary ammonium surfactants are either synthetic or natural materials such as vegetable (e.g., coconut or soybean) or animal (e.g., tallow, mink, pig) oils. The natural materials usually have a distribution of chain lengths (see Table 1 for example).

Given the appropriate concentrations and amount of solution sprayed onto the surface, a continuous layer of surfactant is created on the glass surface. Since the surface has an initial overall negative charge, the cationic head of a cationic surfactant is at the surface with the hydrophilic tail pointing away from the surface. Washing with either tap water or deionized water removes excess surfactant to leave a monolayer of surfactant on the surface. Contact angles of water droplets on a surface with a monolayer of this family of surfactants range from 60–75°.

Good coatings are dependent upon surfactant concentration, purity, and chain length. Chain lengths of less than 8 carbons do not form coatings capable of providing hydrophobicity to the glass surface after being rinsed in water. That is, the contact angle after rinsing is less than 8° indicating the surface has essentially nothing on it. As the chain length grows, the interchain interactions increase giving greater stability to the surface coating.

Cationic surfactants having one or two long alkyl chains generally form the best coatings. Surfactants with three long alkyl chains can also be used but can be difficult to get into aqueous solution. Similarly, surfactants with chain lengths of 16 carbons or longer can be difficult to get into aqueous solution.

Application of the Film

The film is preferably applied to the surface by spraying a solution (emulsion) of the surfactant and an aqueous solvent (e.g., deionized water) onto the surface and evaporating the aqueous solvent to form the film. As discussed above, the film is preferably applied to a newly formed sheet of glass immediately after the forming process. In particular, the aqueous solution is applied to the glass while its temperature is above 175° C., preferably above 200° C., and most preferably above 250° C., where the temperature of the glass is preferably measured with an infrared detector of the type commonly used in the art. The temperature of the glass is preferably less than 400° C., e.g., around 300° C., at the beginning of the coating application process.

Application of the film at this point in the manufacturing process is advantageous because the glass is clean, and the film will protect the glass during the remainder of the manufacturing process. Application of a film to glass at this temperature means that the application time may need to be relatively short depending on the rate at which the glass is being formed and the minimum glass temperature permitted at the end of the application process (see below).

The glass may be formed by several different processes, including float processes, slot-draw processes, and fusion draw processes. See, for example, U.S. Pat. Nos. 3,338,696 and 3,682,609, which are incorporated herein by reference in their entirety. In the slot-draw and fusion draw processes, the newly-formed glass sheet is oriented in a vertical direction. In such cases, the aqueous solution should be applied under conditions that do not result in the formation of drips since such drips can interfere with cutting of the glass, e.g., the drips can cause the glass to crack. In general terms, dripping can be avoided by adjusting the spray level to keep the glass at a temperature above 150° C. throughout the coating process. As the spray level is adjusted, e.g., reduced, the concentration of surfactant in the solution also needs to be adjusted, e.g., increased, to insure that an adequate amount of surfactant reaches the surface to completely coat the surface of the glass.

Rather than spraying, the coating can also be applied from a flexible material impregnated with a solution comprising the film material. Other possibilities include dipping, meniscus coating, rollers, brushes, etc. Spraying is considered most preferred since it readily accommodates movement of the glass introduced by the glass manufacturing process. Typically, both sides of the glass will be sprayed simultaneously, although sequential coating of individual sides can be performed if desired.

The concentration of the surfactant in the aqueous solution will typically be between about $10^{-6}$ moles/liter and about 0.5 moles liter. Preferably, the concentration is in the range from about $10^{-4}$ moles/liter to about $10^{-2}$ moles/liter.

The coated glass may be cured after the film is applied. A curing step may enhance the hydrophobicity of the films. The curing may be accomplished by any means, such as heat curing or by forming free radicals via exposure to ionizing radiation, plasma treatment, or exposure to ultraviolet radiation at levels sufficient to achieve curing but not so high as to degrade the desired coating properties or remove the coating. Heat treatment is preferred.

The glass also may be rinsed after the film material has been applied, before or after any curing step. Rinsing can be done with sonication to improve film removal. This rinsing can remove the bulk of the excess film material, leaving a monolayer of molecules grafted to the glass surface.

Cutting and/or grinding of glass sheets typically involves the application of water to the sheet. This water can perform the rinsing of the coating to remove excess film material. In some cases, the water used during cutting/grinding may remove too much material. In these cases, rather than using water, an aqueous solution of the surfactant can be used which will reduce the amount of surfactant removed from the surface. In cases where the coating comprises more than one surfactant, the solution used in cutting/grinding can include all or just some (e.g., just one) of the surfactants making up the coating.

In applying the coating, flammable liquids, even as co-solvents, should generally be avoided. In particular, the use of alcohols or ketones as solvents should be avoided, as they have a tendency to adsorb onto the silanol groups on the fresh glass surface. They are, as such, contaminants that interfere with the desired surfactant adsorption onto the freshly-formed glass surface.

Removal of the Film

A key to a successful protective coating is having it survive the manufacturing process and still be removable when desired. Coatings composed of the surfactants discussed above can be applied to the glass before it is scored for the first time and are robust enough to survive the rest of the manufacturing process. They can be removed by using various commercial detergent packages either alone or in combination with brush washing and/or ultrasonic cleaning. The detergent packages typically contain both an anionic surfactant and a nonionic surfactant. Alternatively, the detergent package can contain only a nonionic surfactant at a strongly basic pH, e.g., a pH around 12.

As a further alternative, oxidization of the coating can be employed for removal. In accordance with one embodiment of the invention, the film is removable by exposure to UV radiation, such as short wavelength UV radiation, which produces ozone which oxidizes the coating. The UV/ozone oxidation technique can be practiced using a low pressure mercury lamp that generates short wavelength UV radiation that converts oxygen to ozone. UV radiation with a wavelength below about 300 nm is particularly suitable, such as the 184.9 nm and 253.7 nm wavelengths generated by a low pressure mercury vapor lamp. The by-products of the UV removal process include ozone and trace quantities of carbon dioxide and water. The amounts of carbon dioxide and water are minimal because of the low density of the coating. This removal process can take from as little as one minute to one hour, and returns the glass surface to its original pristine state, similar to that found immediately after forming.

Other oxidization approaches include (1) the use of a corona discharge to produce ozone, and (2) the use of ozonated water (i.e., water in which ozone has been dissolved using, for example, a corona discharge). Oxidation can be used in combination with a detergent package and/or a brush washer and/or ultrasonic cleaning, in which case, the oxidation may only need to be applied at a strength and for a time period (e.g., 30 seconds) sufficient to attack the outer surface of the coating.

It should be noted that the removal of the coating can be done by the manufacturer of the glass or the glass can be shipped to the ultimate user, e.g., a manufacturer of liquid crystal display devices, and the user can remove the coating from the glass.

Preparation of the Glass Surface

As discussed above, the coatings of the invention are preferably applied directly to newly-formed glass while it is still hot to minimize the opportunities for contamination. However, if this is not done (e.g., in a laboratory setting to test coatings), the glass surface may need cleaning prior to application of the film. This cleaning may be accomplished by various means including chemical cleaning methods known in the art and pyrolysis. Example 1 below sets forth cleaning methods that may be used to prepare the glass surface.

The following cleaning techniques are designed to remove absorbed organic molecules from the glass surface. The objective of these methods is to expose the hydroxyl groups and siloxane bonds from molecules in the glass. Two preferred environmentally friendly and non-toxic methods for cleaning the glass substrates are UV/ozone cleaning and pyrolysis. UV/ozone cleaning is carried out with a low pressure mercury lamp in an atmosphere containing oxygen. This is described, for example, in Vig et al., *J. Vac. Sci. Technol.* A 3, 1027, (1985), the contents of which are incorporated herein by reference. A low pressure mercury grid lamp from BHK (88–9102–20) mounted in a steel enclosure filled with air is suitable for carrying out this cleaning method. The surface to be cleaned may be placed about 2 cm from the lamp, which may be activated for about 30 minutes, after which the surface is clean. A second technique is pyrolysis, where the surface is slowly heated to about 500° C., kept at this temperature for about four hours, and slowly cooled. Typical temperature ramping times are about five hours when heating and cooling. Other cleaning techniques include laser ablation and passing a flame across the surface.

Two acid cleaning techniques also may be used to clean the glass. These are less preferred as they involve hazardous liquids. These techniques use a strong acid with an oxidizing agent to remove organic molecules absorbed on the glass surface. One technique uses a solution comprising about 3 parts hydrogen peroxide with about 7 parts concentrated sulfuric acid (this ratio is not fixed and can vary from about 1:9 to about 1:1) that is used fresh and hot (above about 90° C.). The other method uses a saturated solution of potassium dichromate in concentrated sulfuric acid which can be prepared by fully dissolving 20 grams of potassium dichromate in 90 grams of water and then slowly adding 900 grams of concentrated sulfuric acid. The glass is first cleaned by removing all visible traces of dirt, for example, by washing in a surfactant solution. It is then immersed in the oxidizing acid solution for about 20 minutes and rinsed with water. If chromic acid has been used, the sample is then immersed in 6N hydrochloric acid for about 20 minutes and rinsed again with water. Preferably, organic-free double-distilled or equivalently purified water is used. The surfaces may then be blow dried under a stream of clean nitrogen or used wet. To check for cleanliness, the water film on the surface should be thin, forming optical interference fringes, as described in more detail in Example 1 below. If the surface dewets, it needs to be re-cleaned. These acid cleaning procedures leach alkali components from the glass surface, which in certain cases, such as sodalime glass, may increase the durability of the glass.

EXAMPLES

The following examples provide detailed illustrations of the invention, and are not intended to limit the scope of the invention to the specific embodiments described therein.

Example 1

This example illustrates the formation of a cationic surfactant film on a glass surface which will protect the surface from ambient contaminants.

1. Preparation of Glass Surface

A sheet of glass was cleaned by dipping for 20 minutes in a solution Chromerge, at room temperature, or in freshly-prepared Pirani Etch. Chromerge consists of a saturated solution of potassium dichromate in concentrated sulfuric acid and was prepared by completely dissolving 20 grams of potassium dichromate (Rectapur grade from Prolabo, France 94120) in 90 grams of water. Nine hundred grams of reagent grade concentrated sulfuric acid (Normapur grade from Prolabo, France 94120) were slowly added to this solution. The final solution was used after cooling to room temperature. Following cleaning in Chromerge, the glass was rinsed copiously with water and placed in a 6N solution of hydrochloric acid (HCL) (Analypur grade from fisher Scientific, 78996 France) for 20 minutes. The hydrochloric acid bath, designed to remove any chromium ions left on the silica surface, was prepared by adding one volume of water to one volume of reagent grade concentrated hydrochloric acid. The glass was finally rinsed with water, ending the cleaning procedure.

Pirani Etch was prepared by adding 7 parts concentrated sulfuric (Normapur grade from Prolabo, France 94120) to three parts hydrogen peroxide solution (Normapur grade from Prolabo, France 94120). The solution heated rapidly when freshly mixed and was used immediately. This cleaning was followed by copious rinsing with ultrapure water (resistivity higher than 18 Mohms/cm and less than 10 ppm of organic contaminants).

These processes resulted in clean, wet, glass with a hydrophilic silica surface that was negatively charged. The surfaces remained clean after several days' exposure to ambient air, indicating that ambient contaminants did not adsorb strongly to the glass.

To verify that the surface is uniformly hydrophilic, the water film after the final rinse can be allowed to thin to where it shows optical interference fringes. These fringes should occur over the whole surface. If they do not, the film has undergone dewetting due to surface contamination and the cleaning process should be repeated. Immediately after allowing the film to thin, the glass surface should be covered with water to prevent contamination from ambient dirt.

2. Coating Glass Surface with Cationic Surfactant

A clean sheet of glass was dipped in a 0.4 millimole/liter (mM) aqueous solution of hexadecyltrimethylammonium bromide (CTAB) surfactant. This surfactant adsorbed to the glass surface by charge attraction (its head group is positively charged and the silica surface is negatively charged in water with a pH greater than 2). The glass plate was then pulled out of the solution vertically, and came out "dry," leaving a monolayer of film.

3. Storage and Shipment of Protected Glass

The glass was packed in a rigid plastic or glass container which held it by its edges, and was sealed to keep out dust and other contaminants.

4. Removal of Surfactant Film

After unpacking, the cationic film described above was removed from the sheet of glass by placing the coated surface of the glass about 6–8 cm from a low pressure mercury lamp that generated low wavelength UV radiation and its associated ozone for about 45 minutes.

Example 2

This example illustrates the formation of a stable, hydrophobic, removable coating on a glass surface using the cationic surfactant dicocodimethyl ammonium chloride.

Dicocodimethyl ammonium chloride is made from coconut oil which contains trimyristin, trilaurin, tripalmitin, and tristearitin. See The Merck Index, Tenth Edition, Merck & Co., Inc. Rahway, N. J. 1983. It has two long aliphatic chains on each nitrogen, with the chains on any given molecule generally being of different lengths. Table 1 shows the distribution of chain lengths for ARQUAD 2C-75, a dicocodimethyl ammonium chloride sold by Akzo Nobel. As can be seen from this table, roughly 20% of the molecules will have at least one chain of 16 carbons or more. Some of the 18 carbon chains have a double bond.

ARQUAD 2C-75 as received from Akzo Nobel in isopropanol (5% by weight) was diluted in water to form emulsions. When ARQUAD 2C-75 was diluted by factors of 100–10,000 and sprayed onto glass having temperatures of 15–400° C., the surface of the glass was rendered nonwetting. The spraying was performed using a BINKS 115 spray gun. Higher concentrations could be used but are not needed and would be wasteful of the material. When the coating was removed, ESCA showed that the surface composition was unchanged from uncoated glass.

Samples which were a) coated, b) contaminated with powdered glass, c) stored at 85% humidity/85° C. and then d) cleaned, showed that the coating prevents adhesion of glass chips to the surface.

Example 3

In this example, a variety of cationic, nonionic, and amphoteric surfactants were tested for their ability to provide a removable, hydrophobic coating on LCD glass. The goal of the testing was to identify coatings capable of reducing chip adhesion, as opposed to coatings which provided scratch resistance. The glass preparation and application processes described below are readily performed in a laboratory setting and provide data predictive of the behavior of coating formulations in a production environment.

The glass used in the experiments was 1737 LCD glass produced by Corning Incorporated (Corning, New York). Samples were cleaned in a 2% solution of detergent (CA05, Semiclean KG, or CONTRAD 70) in a 40 kHz ultrasonic bath at 60° C. for 15 minutes. The samples were then rinsed in deionized (DI) water, and placed in a second 40 kHz ultrasonic bath with DI water (60° C.) for 15 minutes. The samples were then rinsed in DI water and allowed to air dry.

The surfactants were diluted in deionized water and mixed to disperse completely. All samples were sprayed onto 5"×5" sheets of 1737 glass which had been preheated on a hot plate to 300° C. A BINKS 115 spray gun was used to coat the samples. Samples were coated until moisture formed on the surface of the glass. After drying in ambient conditions, samples were rinsed in DI water to remove excess surfactant and allowed to dry.

Contact angle measurements were made on a microscope stage with a NEC CCD connected to a monitor and printer. Drops of 18 megaohm water were made with a Gilmont GS-1200 micrometer syringe. Pictures of the drops were taken and the angles measured manually with a protractor. Each sample was measured with 4 drops spaced over the 5"×5" sheet and the contact angles were then averaged. Alternatively, contact angles were determined using a CONNELLY contact angle analyzer. This device uses a CCD camera to take a picture and a computer to analyze the picture and determine the contact angle. While contact angle values can be measured to a fraction of a degree, the variation in measurements is often $\pm 3°$. As a result, the reported values are to the nearest degree. All measurements were made on the same day that the coating had been made or removed to eliminate concerns about adsorption of organics from the air.

Since the glass was heated to 300° C. and the coating was applied as a spray, the coating application was clearly not done under equilibrium conditions. Nonetheless, the coating consistency can be measured by contact angle. After rinsing the glass of excess material, the measured contact angle is a function of the surfactant concentration in the coating.

Figure 4:
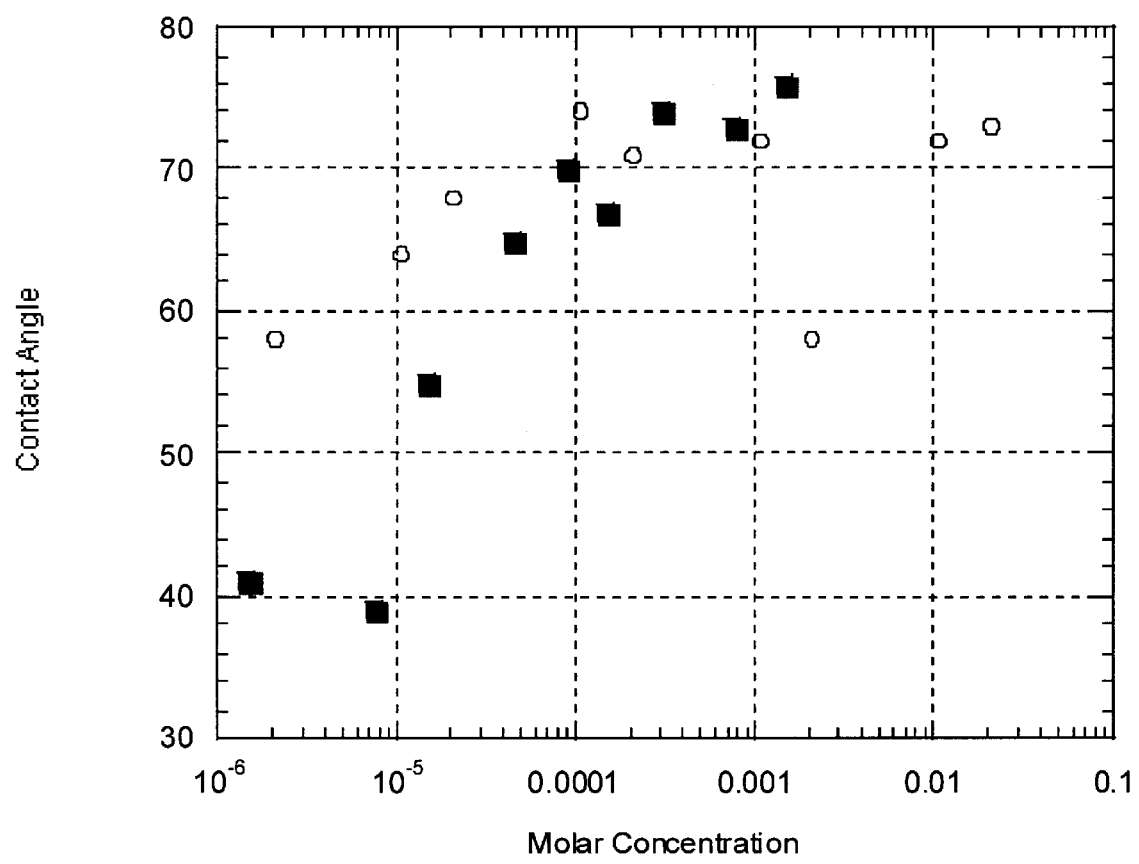
FIG. 4 is a plot of contact angle versus surfactant concentration in a spray solution for the cationic surfactants dicocodimethyl ammonium chloride (solid square data points) and didecyldimethyl ammonium chloride (open circle data points).

FIG. 4 shows titration curves (also referred to herein as "isotherms") for dicocodimethyl ammonium chloride and BTC 1010 (didecyldimethyl ammonium chloride). In these curves, the lower limiting concentration is never reached. The curves show that the concentrations of the spray solution for this work is well above the amount needed to obtain a good consistent layer on the glass.

Comparing FIGS. 2 and 4 reveals that the isotherms for application of these cationic surfactants at temperatures where the water evaporates within seconds are similar to the equilibrium, low temperature isotherms. Prior to the present invention, it was not known that these surfactants could successfully organize on a hot surface in such short times.

As can be seen in FIG. 4, BTC 1010 appears to reach monolayer coverage at lower concentrations than dicocodimethyl ammonium chloride by a factor of 2 to 3. Generally, longer aliphatic chains result in lower critical micelle concentrations. In studies where two surfactants of different chain lengths were mixed in controlled ratios, the slope of the isotherm did not change but the isotherm shifted to lower solution concentrations as the relative concentration of the longer chain surfactant increased. See Harell, J. H., Scamehorn, J. F. "Adsorption from Mixed Surfactant Systems", in *Mixed Surfactant Systems*, Surfactant Series Vol. 46, Ogino, K, and Abe, M, Ed.; Marcel Dekker, Inc. New York, 1992, pp. 263–281.

Since the average chain length of dicocodimethyl ammonium chloride and BTC 1010 are roughly 13 carbons and 10 carbons, respectively, the dicocodimethyl ammonium chloride isotherm would be expected to be to the left of the BTC isotherm. In FIG. 4, the isotherms are reversed from what is expected which indicates the presence of some impurity in ARQUAD 2C-75 which inhibits the initial surface coverage. However, the region 2 slope for dicocodimethyl ammonium chloride appears to be steeper than for BTC 1010 which is consistent with the differences in chain lengths of the two materials. As shown in FIG. 4, with both of these materials, there is a broad window of solution concentration which yields good coatings.

Figure 5:
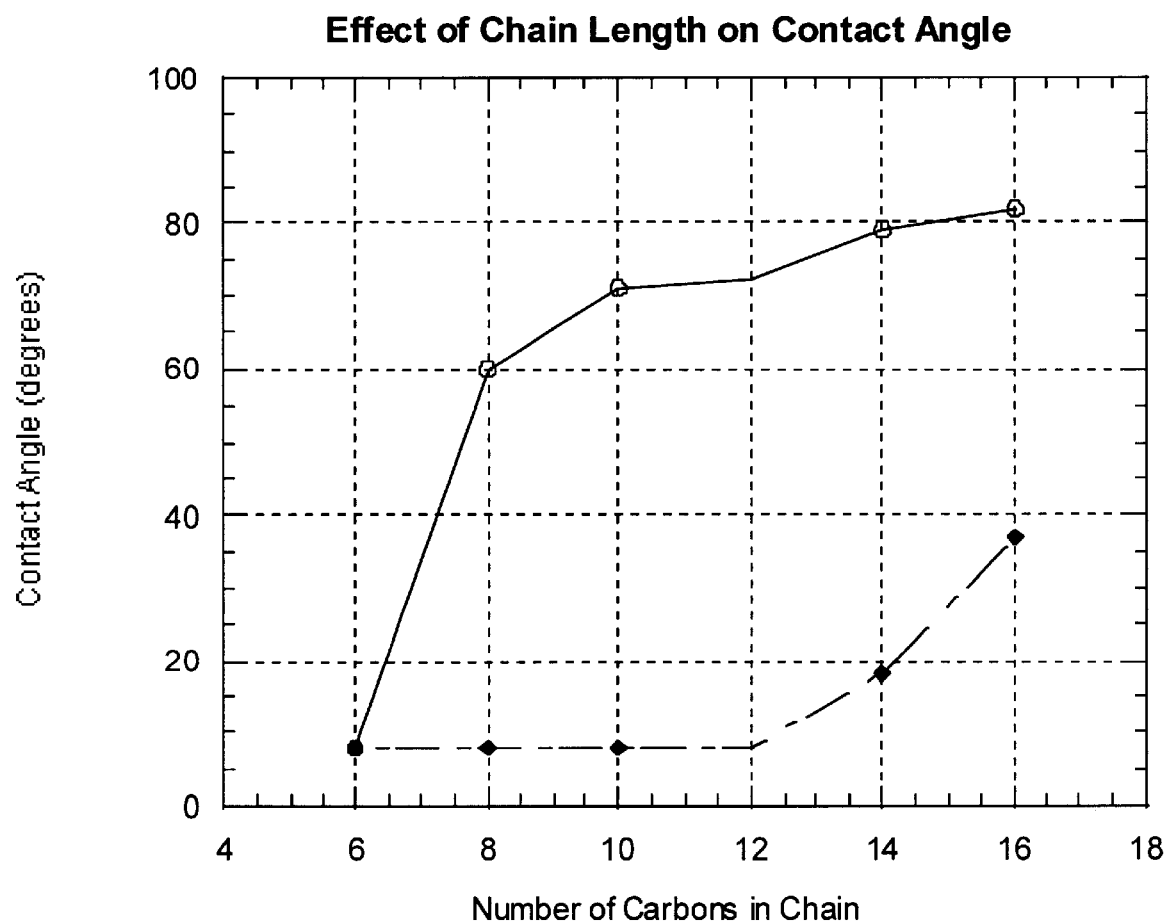
FIG. 5 is a plot of contact angle versus chain length for various cationic surfactants. The open data points are for rinsing with water and the solid data points are for cleaning with CONTRAD 70.

A number of other surfactants were evaluated as shown in Tables 2–5. The effect of chain length on measured contact angle is shown in FIG. 5. In this graph, the contact angles of coatings made with trimethyl (long chain) ammonium salts were plotted. The 6 carbon chain ammonium salt was easily washed off the surface. The 8 carbon chain formed a very stable coating resulting in contact angles of 60° or more. Generally speaking, coatings are considered to be good if the contact angle is $\geq 40°$, preferably $\geq 50°$, after excess surfactant has been washed off. This graph also shows the ease of cleaning in CONTRAD 70. The quaternary ammonium salts having chain lengths greater than or equal to 14 carbons did not come off the surface as easily as those having shorter chain lengths. The contact angles after removal should be $\leq 10°$ and preferably $\leq 8°$.

AFM data on ARQUAD 2C-75 coated glass washed in 2% CONTRAD 70 showed that the surface roughness had returned to the original value. ESCA data showed that the surface composition was essentially the same as uncoated glass. Since residual carbon is often found on glass surfaces when making ESCA measurements, ToF-SIMS was run on samples from which the coating had been removed. No surfactant was found to be bound to the surface.

As detailed in Tables 2–5, cationic surfactants were most successful in forming suitable coatings, some nonionic and some amphoteric surfactants were also acceptable, while anionic surfactants did not form a layer that was stable to further washing with water and thus are unsuitable.

The above examples are intended as illustrations only and do not limit the scope of the invention. It will be apparent to those skilled in the art that various modifications and variations can be made to the processes and compositions of this invention. Thus, it is intended that the present invention cover the modifications and variations of this invention provided they come within the scope of the issued claims and their equivalents.

TABLE 1

Distribution of Chain Lengths in ARQUAD 2C-75

| | # of carbons | | | | | |
|---|---|---|---|---|---|---|
| | 8 | 10 | 12 | 14 | 16 | 18 |
| % of Chains | 5 | 6 | 50 | 19 | 10 | 10 |

TABLE 2

Materials which formed good coatings and could be removed easily using a commercially available aqueous cleaning compound.

| Trade Name | Manufacturer | Type | Contact Angle (°)/Comments |
|---|---|---|---|
| Ammonyx*MO | Stepan | Amine Oxide[3] | 62°/Removed with 2% Contrad 70 (U/S) |
| Amphosol CDB | Stepan | Cationic Polymer | 67°/Removed with 2% Contrad 70 (U/S) |
| Arquad 2C-75 | Akzo Nobel | Cationic | 70°/Removed with 2% Contrad 70 (U/S); not removed with 2% CAO5 or 2% Semiclean KG |
| Arquad DMCB-80 | Akzo Nobel | Cationic | 60°/Removed with 2% Contrad 70 (U/S) |
| BRIJ ®35 | ICI Americas Inc | Nonionic | 55°/Removed with 2% Contrad 70 (U/S) |
| Didecyldimethylammonium Chloride (BTC 1010) | Stepan | Cationic | 82°/Removed with 2% Contrad 70, as well as 2% CAO5 and 2% Semiclean KG |
| Didodecyldimethylammonium Bromide | Aldrich | Cationic | 67°/Removed with 2% Contrad 70 (U/S) |
| Dodecyltrimethylammonium Bromide | Aldrich | Cationic | 55°/Removed with 2% Contrad 70 (U/S) |
| Myristyltrimethylammonium Bromide | Aldrich | Cationic | 62°/Removed with 2% CAO5 (U/S) |
| Rewoteric am B-14 LSU | WITCO | Betaine | 64°/Removed with 2% Contrad 70 (U/S) |
| Rewoteric am HC | WITCO | Betaine | 68°/Removed with 2% CAO5 (U/S) |

TABLE 2-continued

Materials which formed good coatings and could be removed easily using a commercially available aqueous cleaning compound.

| Trade Name | Manufacturer | Type | Contact Angle (°)/Comments |
| --- | --- | --- | --- |
| Tween ®85 | ICI Americas Inc | Nonionic | 42°/Removed with 2% Contrad 70 |
| Varox 1770 | WITCO | Amine oxide[3] | 62.6°/Removed with 2% CAO5 |

[1]Contrad 70, CAO5, and Semiclean KG are commercial cleaning products sold by Decon Labs, Inc. (Bryn Mawr, Pennsylvania), SPC Electronics America, Inc. (Norcross, Georgia), and Yokohama Oils and Fats Industry Co., Ltd. (Yokohama-Shi Kana Gawa-Ken, Japan), respectively.
[2]U/S = 40 kHz ultrasonic wash at 50° C.
[3]Amine oxide becomes protonated in solution and thereby becomes a cationic surfactant.

TABLE 3

Materials which formed good coatings but were difficult to remove with aqueous commercial cleaning compounds (detergent based). Although not tested, these materials are expected to be removable using an oxidizing treatment first and then an aqueous commercial cleaning compound.

| Trade Name | Manufacturer | Type | Contact Angle (°)/Comments |
| --- | --- | --- | --- |
| Dihexadecyldimethylammonium Bromide | Aldrich | Cationic | 77° with coating/17° after cleaning with Contrad 70 |
| Dimethylditetradecylammonium Bromide | Aldrich | Cationic | 76° with coating/18° after cleaning with Contrad 70 |
| Ethomeen C/12 | Akzo Nobel | Ethoxylated amine[1] | 68°/16° after washing with 2% Contrad 70 |
| Ethomeen T/25 | Akzo Nobel | Ethoxylated amine[1] | 50°/17° after washing with 2% Contrad 70 |
| Ethoquad C/12*NIT | Akzo Nobel | Cationic | 62°/15° after washing with 2% Contrad 70 |
| Incroquat-26 | Croda | Cationic | 58°/20° after washing with 2% Contrad 70 |
| Polyamic Acid | BASF | Cationic Polymer | 67°/13° after washing with 2% Contrad 70 |
| Rewoteric am DML-35 | WITCO | Betaine | 49°/9° after washing with 2% CAO5 |
| UCARE Polymer LR-30M | Amerchol | Cationic polymers | Initial contact angle after rinsing was 23°. After washing with Contrad 70, the contact angle was 96°. |
| UCARE Polymer LR-400 | Amerchol | Cationic polymers | Initial contact angle after rinsing was 17°. After washing with Contrad 70, the contact angle was 83°. |

[1]Ethoxylated amines become protonated in solution and thereby become cationic surfactants.

TABLE 4

Materials which did not have high enough water solubility to make effective coatings.

| Trade Name | Manufacturer | Type | Contact Angle (°)/Comments |
| --- | --- | --- | --- |
| Octadecyltrimethylammonium Bromide | Aldrich | Cationic | 80°/Required cosolvent of isopropanol to make a stable solution. |
| Arquad 2HT-75 | Akzo Nobel | Cationic | Solubility in water is too low. Dissolving in isopropanol/water could make a solution. |

TABLE 5

Materials which did not form good coatings.

| Trade Name | Manufacturer | Type | Contact Angle (°)/Comments |
| --- | --- | --- | --- |
| Benzyltriethylammonium Bromide | Aldrich | Cationic | 32° |
| BRIJ ®30 | ICI Americas, Inc | Nonionic | 39° |
| Dodecyl Sulfate | Aldrich | Anionic | <8° |
| Merquat 550 | Calgon | Cationic Polymer | 8° |
| Mirapol 550 | Rhodia | Cationic Polymer | 10° |
| Mirapol A-15 | Rhodia | Cationic Polymer | 22° |
| Oleic Acid | Fisher | Anionic | Room Temp Application - 62°/9° Removed with 2% Contrad 70 300° C. Application - 44°/20° Removed with 2% Contrad 70 |

TABLE 5-continued

Materials which did not form good coatings.

| Trade Name | Manufacturer | Type | Contact Angle (°)/Comments |
| --- | --- | --- | --- |
| Triethylhexylammonium Bromide | Aldrich | Cationic | <8° |
| Varonic K-202 | WITCO | Nonionic | 80°/Easily Rinsed off with water |

What is claimed is:

1. A method for treating glass having at least one substantially flat surface comprising:
   (a) forming a hydrophobic coating on the surface by applying an aqueous solution comprising at least one surfactant to the surface as part of the manufacturing process for the glass, wherein:
      (1) the manufacturing process produces newly formed glass at an elevated temperature;
      (2) the newly formed glass is at a temperature above 175° C. when it first comes into contact with the aqueous solution;
      (3) the surfactant is selected from the group consisting of cationic surfactants, non-ionic surfactants, and betaines; and
      (4) the coating reduces adhesion of glass chips to the surface;
   (b) cutting the glass;
   (c) grinding and/or polishing at least one edge of the cut glass; and
   (d) removing the coating from the surface; wherein:
      (i) water or a water-containing solution is applied to the coated surface during at least one of steps (b) and (c); and
      (ii) the coating has a sessile drop contact angle of at least 40° after steps (b) and (c).

2. The method of claim 1 wherein the glass is vertical in step (a) and the temperature of the glass remains sufficiently high throughout step (a) so that drips do not form on the surface.

3. The method of claim 1 wherein the temperature of the glass is at least 150° C. at the end of step (a).

4. The method of claim 1 wherein the newly formed glass is at a temperature above 250° C. when it first comes into contact with the aqueous solution.

5. The method of claim 1 wherein the aqueous solution is applied to the surface by spraying.

6. The method of claim 1 wherein the surfactant is a cationic surfactant which comprises at least one straight or branched hydrocarbon chain that comprises on average at least 8 and no more than 18 carbon atoms.

7. The method of claim 6 wherein the cationic surfactant comprises two straight or branched hydrocarbon chains each of which comprises on average at least 8 and no more than 18 carbon atoms.

8. The method of claim 7 wherein the surfactant is a dicocoalkyldimethyl ammonium salt.

9. The method of claim 7 wherein the surfactant is a didecyldimethyl ammonium salt.

10. The method of claim 1 wherein the concentration of the surfactant in the aqueous solution is between about $10^{-6}$ moles/liter and about 0.5 moles/liter.

11. The method of claim 1 wherein the coating reduces the number of glass chips adhered to the surface by at least 80 percent compared to the number of glass chips adhered to an uncoated surface under comparable conditions.

12. The method of claim 11 wherein the number of glass chips adhered to the surface is reduced by at least 90 percent.

13. The method of claim 1 wherein step (d) comprises applying an aqueous solution which comprises a detergent to the coating.

14. The method of claim 13 wherein step (d) comprises applying ultrasonic energy to the coating.

15. The method of claim 13 wherein step (d) comprises brush washing the surface.

16. The method of claim 13 wherein step (d) comprises applying ultrasonic energy to the coating and brush washing the surface.

17. The method of claim 1 wherein step (d) comprises oxidizing at least the outer surface of the coating.

18. The method of claim 13 wherein step (d) comprises oxidizing at least the outer surface of the coating.

19. The method of claim 14 wherein step (d) comprises oxidizing at least the outer surface of the coating.

20. The method of claim 15 wherein step (d) comprises oxidizing at least the outer surface of the coating.

21. The method of claim 16 wherein step (d) comprises oxidizing at least the outer surface of the coating.

22. The method of claim 17 wherein the outer surface of the coating is oxidized using ozone.

23. The method of claim 22 wherein the ozone is produced using a corona discharge.

24. The method of claim 22 wherein the ozone is produced using UV light.

25. The method of claim 17 wherein the outer surface of the coating is oxidized using ozonated water.

26. The method of claim 1 wherein the coating has a sessile drop contact angle of at least 50° after steps (b) and (c).

27. The method of claim 1 wherein the surface has a sessile drop contact angle of less than 10° after step (d).

28. The method of claim 1 wherein in at least one of steps (b) and (c), a water-containing solution comprising a surfactant used in step (a) is applied to the coated surface.

29. The method of claim 1 wherein after rinsing with water and prior to step (d), the coating is sufficiently thin to permit visual inspection of the glass through the coating.

30. The method of claim 1 wherein the glass has two substantially flat surfaces and the coating is formed on both surfaces in step (a).

31. The method of claim 1 wherein after step (d), the glass is used to make a liquid crystal display.

* * * * *